(12) United States Patent
Kobana

(10) Patent No.: US 11,792,333 B2
(45) Date of Patent: Oct. 17, 2023

(54) IMAGE READING APPARATUS, CONTROL METHOD, AND PRODUCT FOR PUSH SCANNING AND REAUTHENTICATION IN RESPONSE TO AN AUTHENTICATION ERROR

(71) Applicant: CANON KABUSHIKI KAISHA, Tokyo (JP)

(72) Inventor: Yusuke Kobana, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/859,066

(22) Filed: Jul. 7, 2022

(65) Prior Publication Data
US 2023/0068836 A1 Mar. 2, 2023

(30) Foreign Application Priority Data
Aug. 23, 2021 (JP) .................. 2021-135580

(51) Int. Cl.
*H04N 1/00* (2006.01)
*H04N 1/32* (2006.01)

(52) U.S. Cl.
CPC ..... *H04N 1/00228* (2013.01); *H04N 1/32117* (2013.01); *H04N 2201/0094* (2013.01); *H04N 2201/3235* (2013.01)

(58) Field of Classification Search
CPC ........... H04N 1/00228; H04N 1/32117; H04N 2201/0094; H04N 2201/3235
See application file for complete search history.

(56) References Cited

U.S. PATENT DOCUMENTS

| 8,520,229 B2* | 8/2013 | Kusakabe | G06Q 30/02 358/1.14 |
| 10,310,782 B2* | 6/2019 | Yanagi | H04N 1/4413 |
| 10,686,965 B2* | 6/2020 | Nakajima | H04N 1/00225 |
| 11,350,012 B2* | 5/2022 | Sasaki | H04N 1/0097 |
| 11,553,095 B2* | 1/2023 | Kobana | H04N 1/0023 |
| 2008/0079990 A1* | 4/2008 | Iida | H04N 1/32144 358/1.15 |

(Continued)

FOREIGN PATENT DOCUMENTS

JP 2008109479 A 5/2008

*Primary Examiner* — Scott A Rogers
(74) *Attorney, Agent, or Firm* — ROSSI, KIMMS & McDOWELL LLP

(57) ABSTRACT

An image reading apparatus receives, from an information processing apparatus, a scanning request for push scanning for a designated destination, scans an original document and generates image data in response to the scanning request, and transmits, to the destination, a request including authentication information for accessing the destination and the image data, and if a response indicating that an error has occurred in authentication using the authentication information is received, the image reading apparatus saves image data for transmission based on reauthentication and provides a notification of the error to the information processing apparatus. The image reading apparatus transmits, to the destination, a request including authentication information for reauthentication and the saved image data if the authentication information for the reauthentication in response to the notification of the error is received from the information processing apparatus.

5 Claims, 19 Drawing Sheets

(56) References Cited

U.S. PATENT DOCUMENTS

| | | | | |
|---|---|---|---|---|
| 2010/0315675 | A1* | 12/2010 | Yagi | H04N 1/32096 358/1.15 |
| 2014/0293315 | A1* | 10/2014 | Takarabe | H04N 1/32122 358/1.14 |
| 2023/0126787 | A1* | 4/2023 | Nakata | H04N 1/4433 358/1.15 |

* cited by examiner

Transmission has been completed.

601 Complete

FIG. 10A

```
POST /ScanJob HTTP/1.1
Host:192.168.1.100
Content-Type: text/xml
Content-Length:454

<?xml version="1.0" encoding="UTF-8"?>
<ScanJob>
    <Source>Platen</Source>
    <Direction>ShortEdgeFeed</Direction>
    <Size>A4</Size>
    <Format>jpeg</Format>
    <ColorMode>Color</ColorMode>
    <Resolution>300</Resolution>
    <Destination>
        <Uri>http://example.cloud.com</Uri>
        <UserName>userA</UserName>
        <Password>1234</Password>
    </Destination>
</ScanJob>
```

FIG. 10B

```
HTTP/1.1 201 Created
```

FIG. 11A

HTTP/1.1 200 OK
Content-Type: text/xml
Content-Length:184

<?xml version="1.0" encoding="UTF-8"?>
<ScanStatus>
  <State>Scanning</State>
  <ScanPage>1</ScanPage>
  <JobStatus>Processing</JobStatus>
</ScanStatus>

FIG. 11B

HTTP/1.1 200 OK
Content-Type: text/xml
Content-Length:183

<?xml version="1.0" encoding="UTF-8"?>
<ScanStatus>
  <State>Idle</State>
  <ScanPage>2</ScanPage>
  <JobStatus>WaitingAuth</JobStatus>
  <JobResult>Failure</JobResult>
</ScanStatus>

FIG. 11C

HTTP/1.1 200 OK
Content-Type: text/xml
Content-Length:183

<?xml version="1.0" encoding="UTF-8"?>
<ScanStatus>
  <State>Idle</State>
  <ScanPage>3</ScanPage>
  <JobStatus>Completed</JobStatus>
  <JobResult>Success</JobResult>
</ScanStatus>

IMAGE READING APPARATUS, CONTROL METHOD, AND PRODUCT FOR PUSH SCANNING AND REAUTHENTICATION IN RESPONSE TO AN AUTHENTICATION ERROR

BACKGROUND OF THE INVENTION

Field of the Invention

The present invention relates to an image reading apparatus, a control method thereof, and a storage medium.

Description of the Related Art

A mode in which an instruction for scanning an original document and transmitting the scanned image to a specific destination server is provided to an image reading apparatus is called "push scanning". In recent years, instructions for push scanning have not been limited to instructions from operation panels on image reading apparatuses and have also been provided from other terminals connected in networks (hereinafter, referred to as client terminals).

There may be cases in which authentication information (such as combinations of usernames and passwords) is needed for reasons such as security for transmission to destination servers. A plurality of methods are conceivable for the authentication information used at the time of transmission to servers in push scanning from client terminals. For example, a method of using authentication information included in a push scanning instruction from a client terminal or a method of using authentication information saved inside the image reading apparatus is conceivable.

Japanese Patent Laid-Open No. 2008-109479 provides a method of saving a scanned image, providing a notification of an error on an operation panel, and performing retransmission when a transmission error occurs in an image reading apparatus.

However, there is a problem that if an authentication error occurs at the time of push scanning using authentication information from a client terminal, a user needs to perform installation of an original document, an input of the authentication information, and the like from the beginning again for retransmission.

SUMMARY OF THE INVENTION

The present invention was made in view of the aforementioned problem and provides an image reading apparatus that allows a user to easily perform transmission at the time of push scanning using authentication information.

An image reading apparatus includes: a memory storing instructions; and a processor executing the instructions causing the image reading apparatus to: receive, from an information processing apparatus, a scanning request for push scanning for a designated destination; scan an original document and generate image data in accordance with the scanning request; transmit, to the destination, a request including authentication for accessing the destination and the image data; save the image data for transmission based on reauthentication if a response indicating that there has been an error in authentication using the authentication information is received; and provide a notification of the error to the information processing apparatus, wherein the instruction causes the image reading apparatus to transmit, to the destination, a request including authentication information for the reauthentication and the saved image data if the authentication information for the reauthentication in response to the notification of an error is received from the information processing apparatus.

Further features of the present invention will become apparent from the following description of exemplary embodiments (with reference to the attached drawings).

BRIEF DESCRIPTION OF THE DRAWINGS

FIGS. 10A and 10B are diagrams illustrating communication content of the push scanning according to the first embodiment.

FIGS. 11A, 11B, and 11C are diagrams illustrating communication content of scanning status acquisition according to the first embodiment.

DESCRIPTION OF THE EMBODIMENTS

Hereinafter, embodiments of the present invention will be described using the drawings. Note that the following embodiments are not intended to limit the inventions of the claims, and all combinations of features described in the embodiments are not necessarily essential for the solution of the present invention.

First Embodiment

As a first embodiment of the present invention, a method in which an image reading apparatus receives authentication information again from a client terminal if an authentication error occurs in push scanning including authentication information from the client terminal will be described. In the present embodiment, it is assumed that HTTP is used for communication and an IP address of an MFP 101 is "192.168.1.100".

Figure 1:
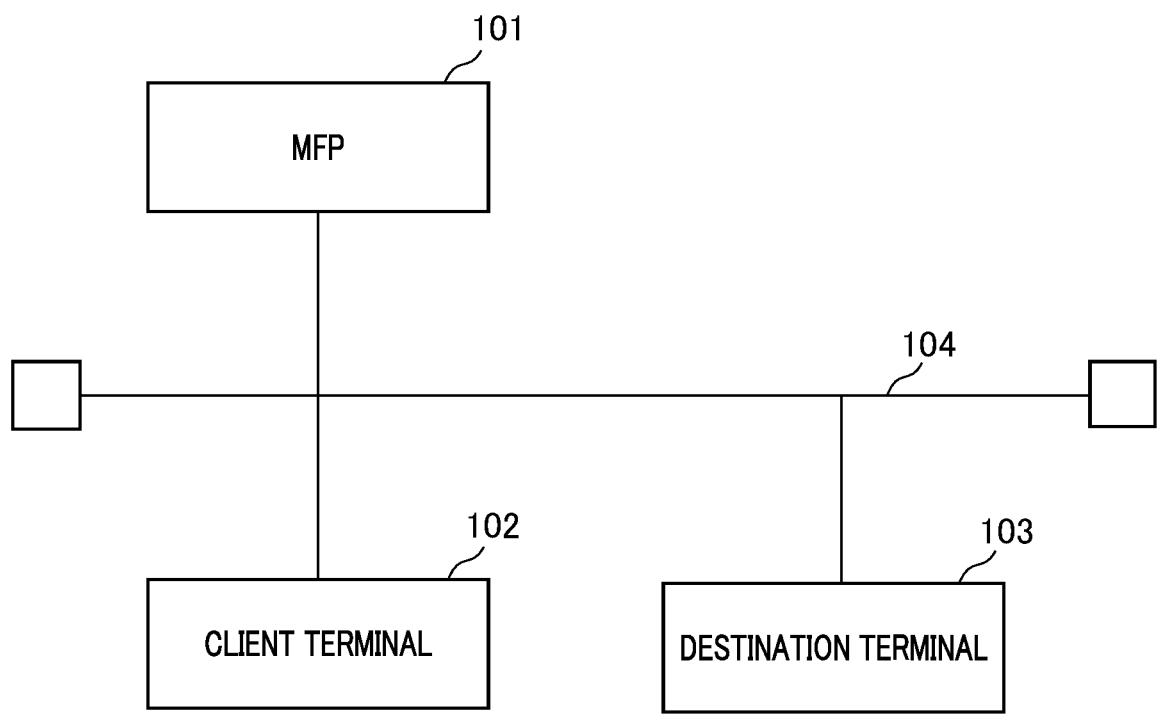
FIG. 1 is a diagram illustrating a system configuration according to a first embodiment.

FIG. 1 is a diagram illustrating a system configuration according to the first embodiment. A configuration example of an image processing system including an image reading apparatus according to the embodiment of the present invention will be described with reference to FIG. 1. The MFP 101, a client terminal 102, and a destination terminal 103 are connected to the image processing system according to the present embodiment via a network 104. The MFP (Multi Function Peripheral) 101 is a full-color image reading apparatus that adopts an electrophotography scheme and has copying and printing functions. In this manner, the MFP 101 is a composite machine that has not only a reading function but also a printing function. The MFP 101 has a function of transmitting an image read by a scanner to the specific destination terminal 103. The client terminal 102 is a terminal of a general information processing apparatus such as a PC or a smartphone. The destination terminal 103 is a server that performs transmission/reception of a file through a file transmission protocol including a hyper text transfer protocol (HTTP) as a representative example and user authentication if needed.

Figure 2:
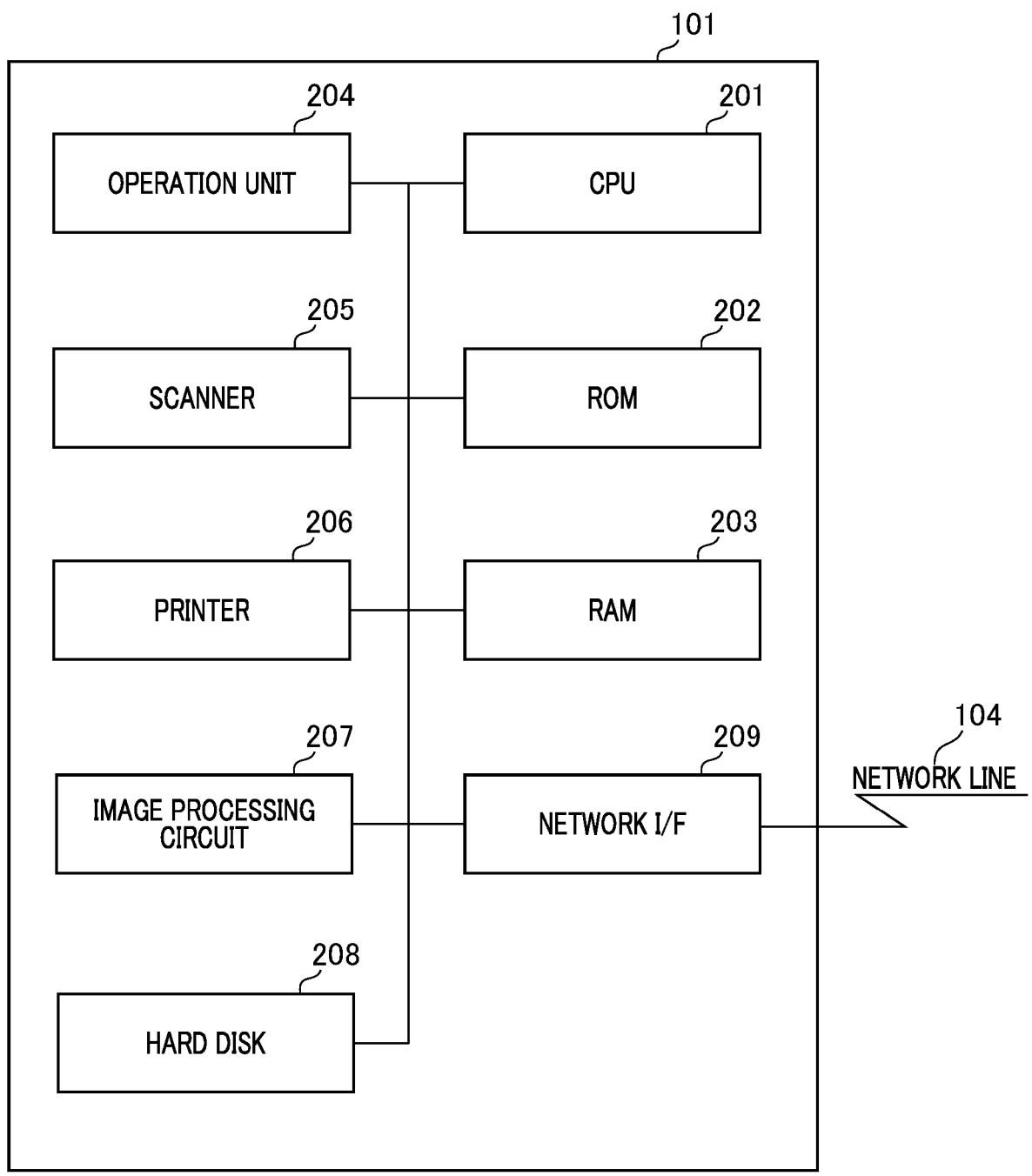
FIG. 2 is a diagram illustrating a hardware configuration of an MFP according to the first embodiment.

FIG. 2 is a diagram illustrating a hardware configuration of the MFP 101 according to the first embodiment. An example of a hardware configuration of the MFP 101 will be described with reference to FIG. 2. The MFP 101 includes a CPU 201, a ROM 202, a RAM 203, an operation unit 204, a scanner 205, a printer 206, an image processing circuit 207, a hard disk 208, and a network I/F 209. The CPU 201 is a control circuit that controls the entire system using a program stored in the ROM 202 and a memory of the RAM 203. The operation unit 204 is a circuit that executes a user operation. The scanner 205 reads an image of an original document and outputs the read image for each page in order. The printer 206 prints an image based on the image on a recording medium. The image processing circuit 207 is configured of a large-capacity image memory, an image rotation circuit, a resolution variable power circuit, and a coding/decoding circuit for MH, MR, MMR, JBIG, JPEG, and the like. The image processing circuit 207 can execute various kinds of image processing such as shading, trimming, and masking. The hard disk 208 is a large-capacity recording medium connected with an I/F such as an SCSI or an IDE. The network I/F 209 is a circuit for connection to the network line 104. The scanner 205, the printer 206, and the image processing circuit 207 are connected via a high-speed video bus that is different from a CPU 201 bus in the CPU 201 and is configured to be able to transmit an image at a high speed. The MFP 101 performs image processing on the image read by the scanner 205 using the image processing circuit 207.

Figure 3:
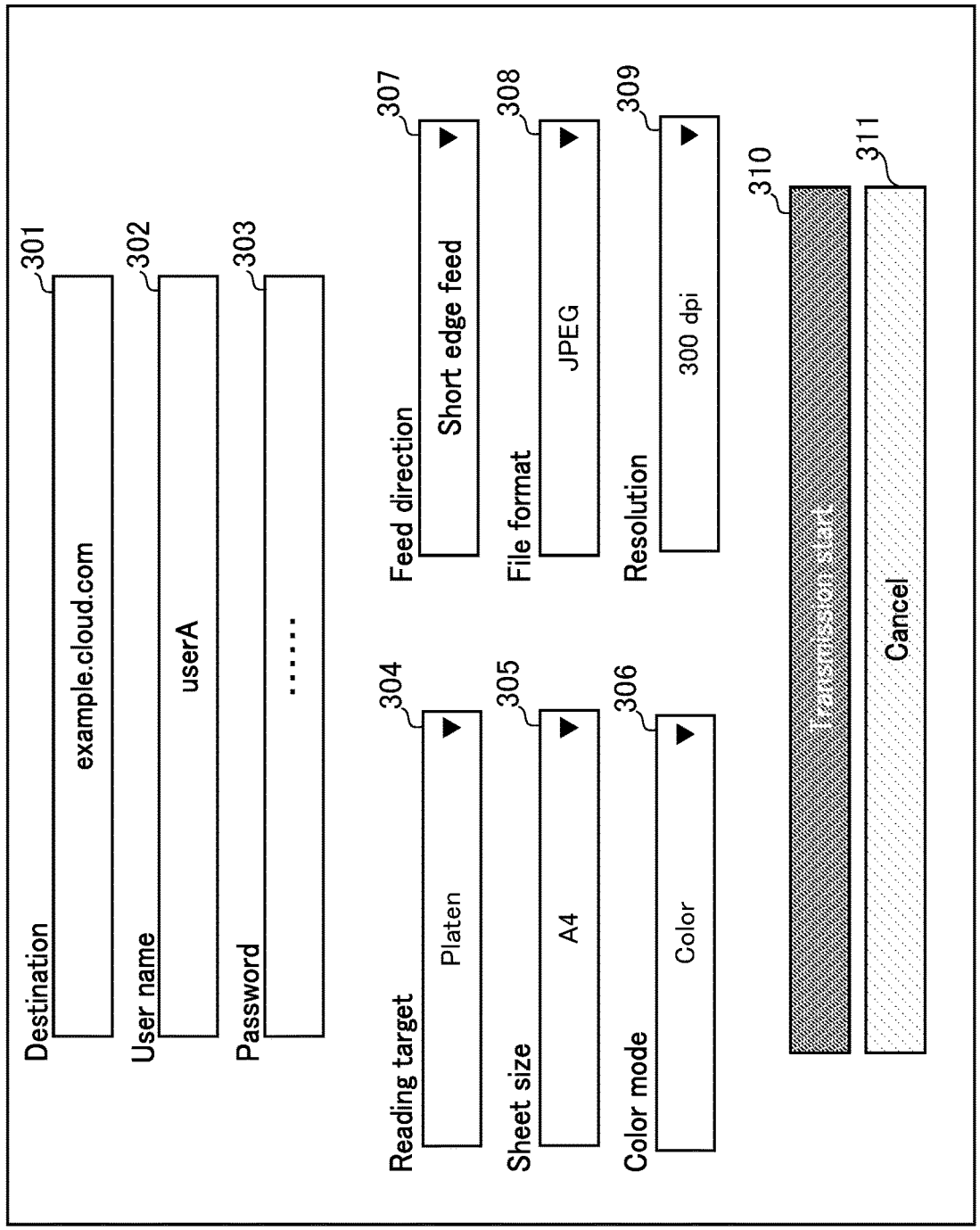
FIG. 3 is a diagram illustrating a scanning setting screen of a scanning application of a client terminal according to the first embodiment.

FIG. 3 is a diagram illustrating a scanning setting screen of a scanning application of the client terminal 102 according to the first embodiment. An example of the scanning setting screen of the scanning application in the client terminal 102 will be described with reference to FIG. 3.

Buttons 301 to 303 are buttons for setting a transmission destination, and a current setting value is displayed on each button. The "destination setting" button 301 is a button for setting a destination. A user can select a desired destination from destinations registered in the client terminal 102 by pressing the "destination setting" button 301. If the desired destination is not included in a list of the destinations, the user can also input a new destination. Also, a destination folder path may be able to be designated. The "username setting" button 302 is a button for setting a user name as authentication information used if authentication is needed for transmitting an image to the destination terminal 103. The "password setting" button 303 is a button for setting a password as authentication information used if authentication is needed for transmitting an image to the destination terminal 103 that is a destination. A configuration in which a plurality of destinations can be set and authentication information can be set for each destination may also be adopted. Although FIG. 3 illustrates only the username and the password as authentication information, the present invention is not limited thereto, and other setting information such as OAuth may be able to be set.

Buttons 304 to 309 are buttons for setting reading, and a current setting value is displayed on each button. The "reading target setting" button 304 is a button for setting a reading target (a platen or a feeder). The "sheet size setting" button 305 is a button for setting the size of a sheet to be read (such as an A4 size or an A3 size). The "color mode setting" button 306 is a button for setting a color mode (color, monochrome, or the like) at the time of scanning. The "feed direction setting" button 307 is a button for setting a feed direction of the original document (short edge feed or long edge feed). The "file format setting" button 308 is a button for setting a file format (JPEG, PDF, or the like) of the image to be transmitted. The "resolution setting" button 309 is a button for setting a resolution (300 dpi, 600 dpi, or the like) at the time of scanning.

The "transmission start" button 310 is a button for starting transmission processing. The "cancel" button 311 is a button for closing this application.

Figure 4:
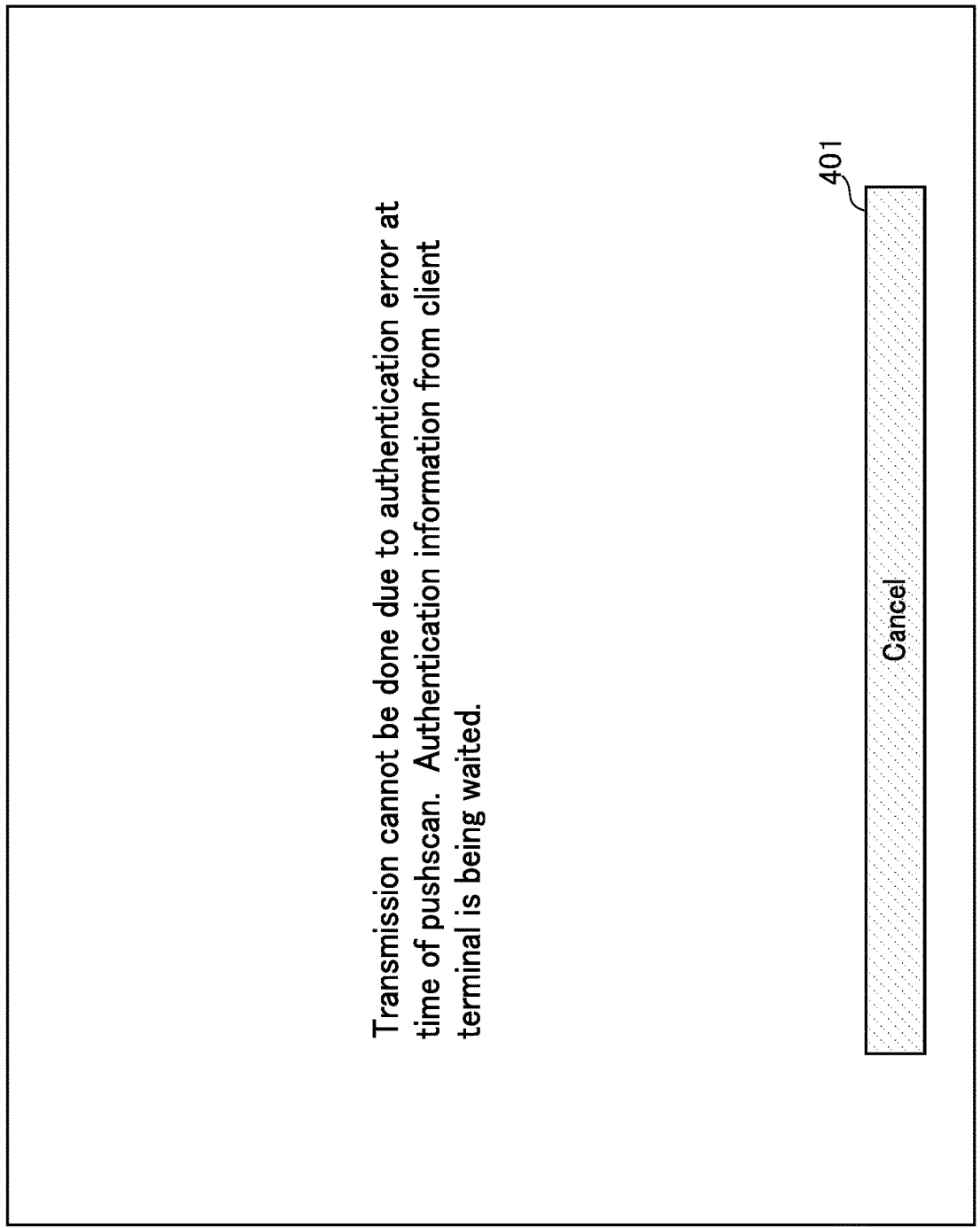
FIG. 4 is a diagram illustrating an authentication information reception screen at the time of push scanning of the MFP according to the first embodiment.

FIG. 4 is a diagram illustrating an authentication information reception screen at the time of push scanning of the MFP 101 according to the first embodiment. An example of a screen when an authentication error has occurred in the MFP 101 during image transmission at the time of push scanning will be described with reference to FIG. 4. The "cancel" button 401 is a button for stopping transmission processing.

Figure 5:
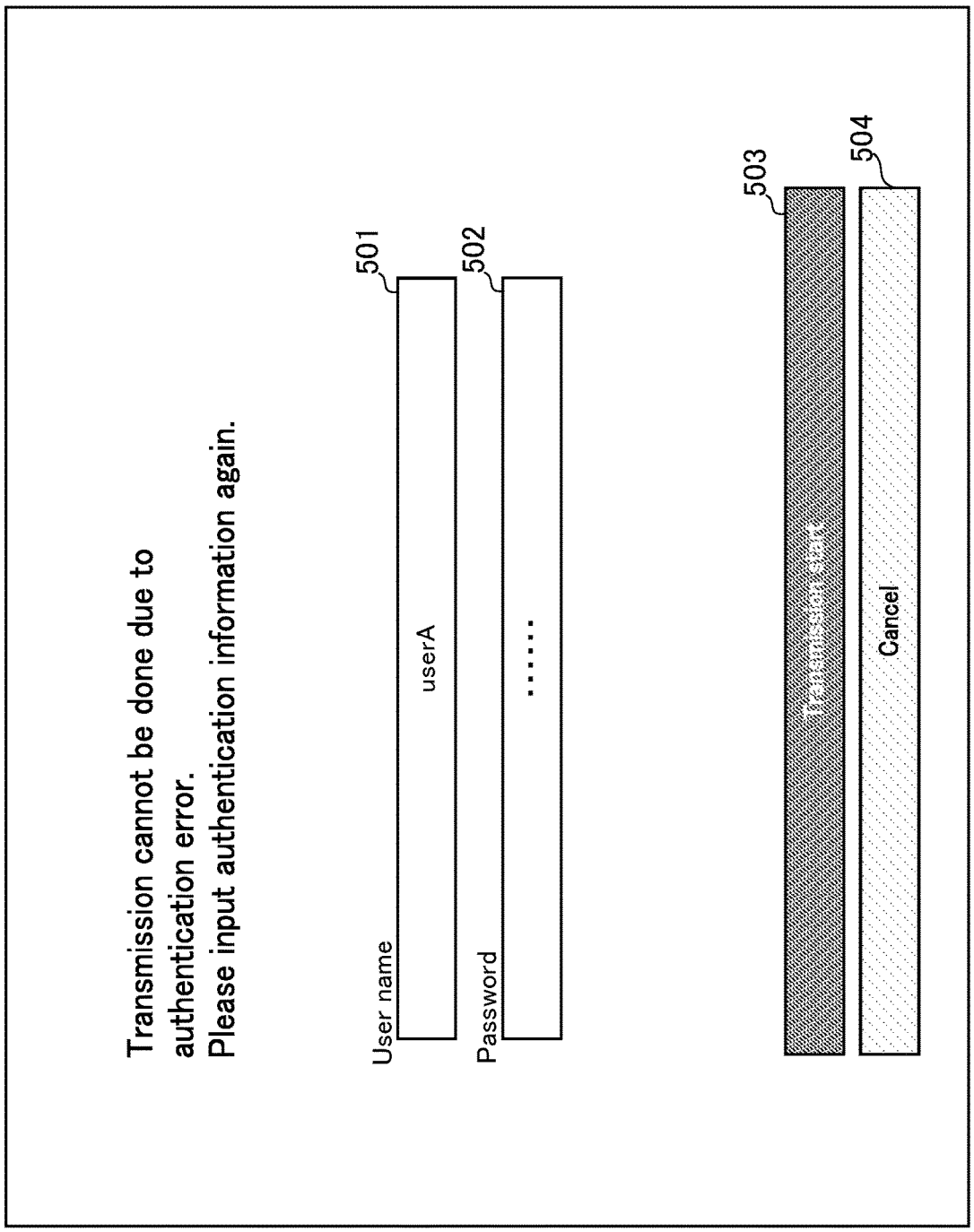
FIG. 5 is a diagram illustrating an authentication information reinput screen of the scanning application of the client terminal according to the first embodiment.

FIG. 5 is a diagram illustrating an authentication information reinput screen of a scanning application of the client terminal 102 according to the first embodiment. An example of a screen that receives an input of authentication information again from the user when an authentication error has occurred in image transmission at the time of push scanning in the scanning application will be described with reference to FIG. 5. A "user name setting" button 501 is a button for setting a user name as authentication information when an instruction for retransmission is provided to the MFP 101. A "password setting" button 502 is a button for setting a password as authentication information when an instruction for retransmission is provided to the image reading apparatus. If OAuth authentication is used as an authentication scheme, a screen configuration for inputting authentication by a browser may be adopted. A "transmission start" button

503 is a button for requesting retransmission. A "cancel" button 504 is a button for stopping retransmission.

Figure 6:
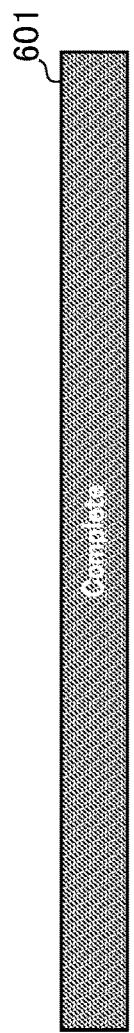
FIG. 6 is a diagram illustrating a transmission completion screen of the scanning application of the client terminal according to the first embodiment.

FIG. 6 is a diagram illustrating a transmission completion screen of the scanning application of the client terminal 102 according to the first embodiment. An example of the transmission completion screen of the scanning application will be described with reference to FIG. 6. A "complete" button 601 is a button for closing the scanning application.

Figure 7:
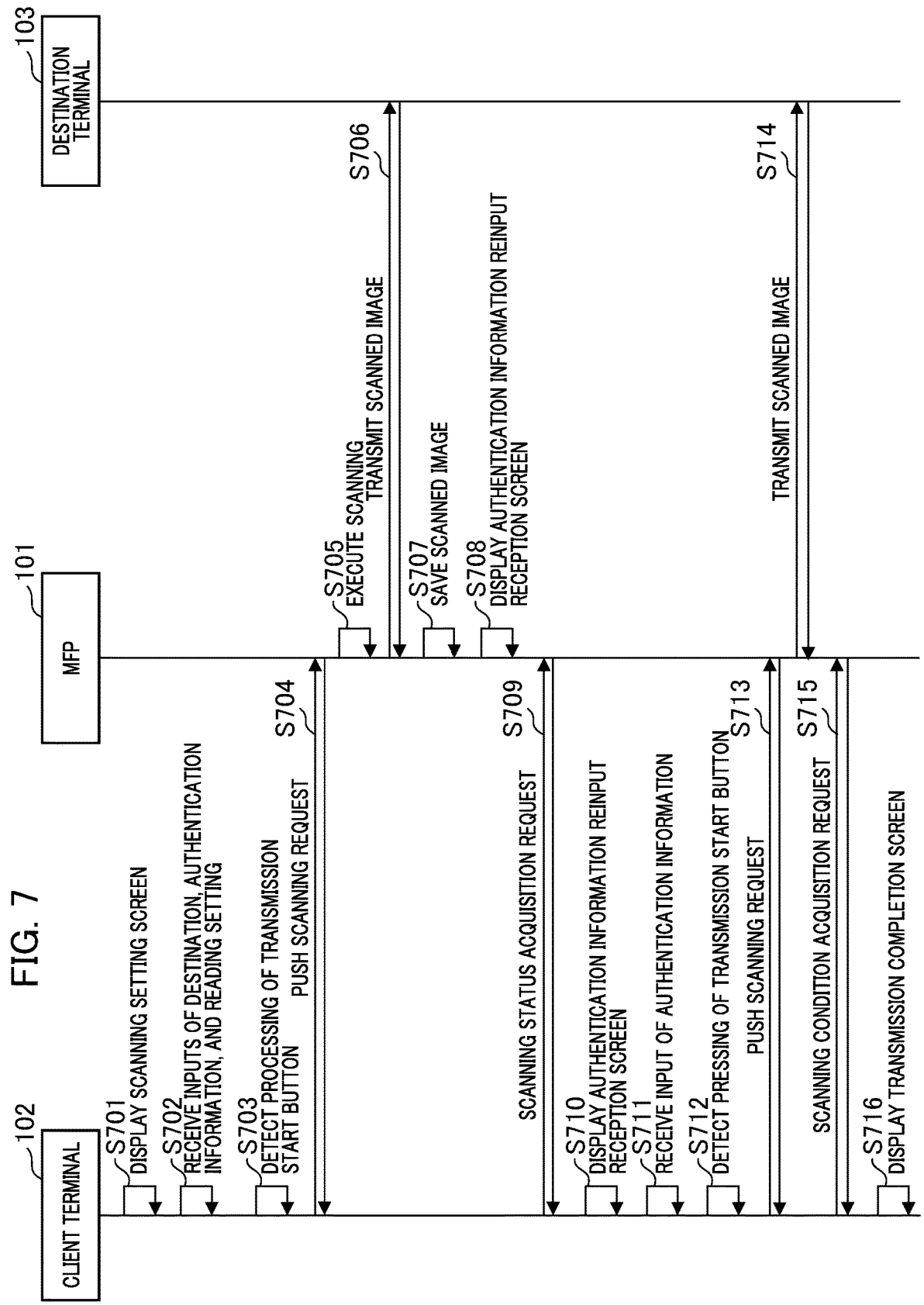
FIG. 7 is a diagram illustrating sequences of the MFP, the client terminal, and a destination terminal according to the first embodiment.

FIG. 7 is a diagram illustrating sequences of the MFP 101, the client terminal 102, and the destination terminal 103 according to the first embodiment. Sequences of processing implemented in the MFP 101, the client terminal 102, and the destination terminal 103 according to the present embodiment will be described with reference to FIG. 7.

The client terminal 102 displays a scanning setting screen as illustrated in FIG. 3 (S701). The client terminal 102 receives destination setting and reading setting operations and performs the setting (S702). The client terminal 102 detects the "transmission start" button 310 having been pressed (S703).

The client terminal 102 requests execution of push scanning from the MFP 101, and the MFP 101 responds to the request (S704). Here, the client terminal 102 is an example of the information processing apparatus that provides a scanning request for push scanning for a designated destination in the present embodiment. Also, the network I/F 209 of the MFP 101 is an example of a reception unit configured to receive the scanning request in the present embodiment.

The MFP 101 executes scanning (S705) and transmits a scanned image to a designated destination (S706). In this case, the MFP 101 switches processing depending on whether or not an authentication error has occurred during transmission. In the present sequence, a case in which an authentication error has occurred will be described. Here, the scanner 205 of the MFP 101 is an example of a generation unit configured to scan an original document and generate image data in response to the scanning request in the present embodiment. The network I/F 209 of the MFP 101 is an example of a transmission unit configured to transmit, to the destination, a request including authentication information for accessing the destination and image data in the present embodiment.

The MFP 101 saves the scanned image therein (S707). Here, the ROM 202 of the MFP 101 is an example of a saving unit configured to save image data for transmission based on reauthentication if a response indicating that an error has occurred in authentication using the authentication information is received in the present embodiment.

The MFP 101 displays an authentication information reinput screen as illustrated in FIG. 4 (S708). The client terminal 102 requests acquisition of a scanning status from the MFP 101, and the MFP 101 responds to the request (S709). Here, the CPU 201 of the MFP 101 is an example of a notification unit configured to provide a notification of an error to the client terminal 102 in the present embodiment.

The client terminal 102 displays an authentication information reinput screen as illustrated in FIG. 5 (S710). The client terminal 102 receives an input of authentication information (S711). The client terminal 102 detects that a transmission start button has been pressed (S712). The client terminal 102 requests execution of push scanning from the MFP 101 using the authentication information input in S711, and the MFP 101 responds to the request (S713). The MFP 101 transmits the scanned image saved in S707 including the authentication information included in S713 to the designated destination (S714). In the present embodiment, the authentication information included in S713 is authentication information for reauthentication. In this case, the MFP 101 switches processing depending on whether or not an authentication error has occurred during transmission. In this sequence, a case in which an authentication error has not occurred during transmission will be described.

The client terminal 102 requests acquisition of a scanning status from the MFP 101, and the MFP 101 responds to the request (S715). The client terminal 102 displays a transmission completion screen as illustrated in FIG. 6 (S716).

Figure 8:
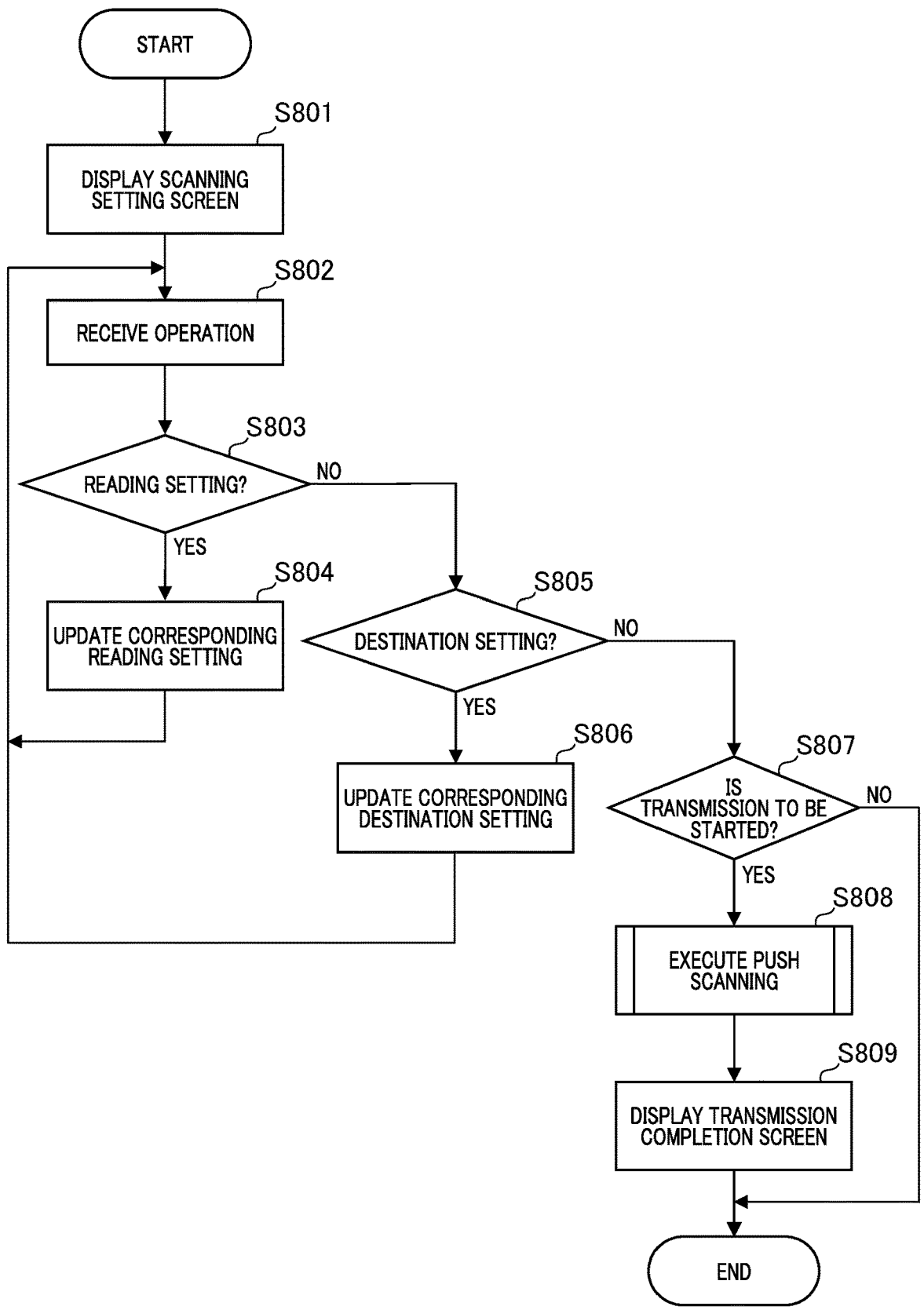
FIG. 8 is a diagram illustrating a flow of the client terminal according to the first embodiment.

FIG. 8 is a diagram illustrating a flow of the client terminal 102 according to the first embodiment. The flow of the client terminal 102 according to the present embodiment will be described with reference to FIG. 8.

The client terminal 102 displays a scanning setting screen as illustrated in FIG. 3 (S801). The client terminal 102 receives an operation from the user (S802). The client terminal 102 determines whether the received operation is setting of reading (S803). In a case of setting of reading, the client terminal 102 updates the corresponding setting of reading (S804). Thereafter, the processing proceeds to S802.

If the received operation is not setting of reading, the client terminal 102 determines whether the received operation is setting of a destination (S805). In a case of setting of a destination, the client terminal 102 updates the corresponding setting of a destination (S806). Thereafter, the processing proceeds to S802.

If the received operation is not the setting of a destination, the client terminal 102 determines whether the received operation is a start of transmission (S807). If the received transmission is not a start of transmission, the processing is ended.

In a case of a start of transmission, the client terminal 102 executes push scanning on the MFP 101 (S808). The client terminal 102 displays a transmission completion screen as illustrated in FIG. 6 (S809). Thereafter, the processing is ended.

Figure 9:
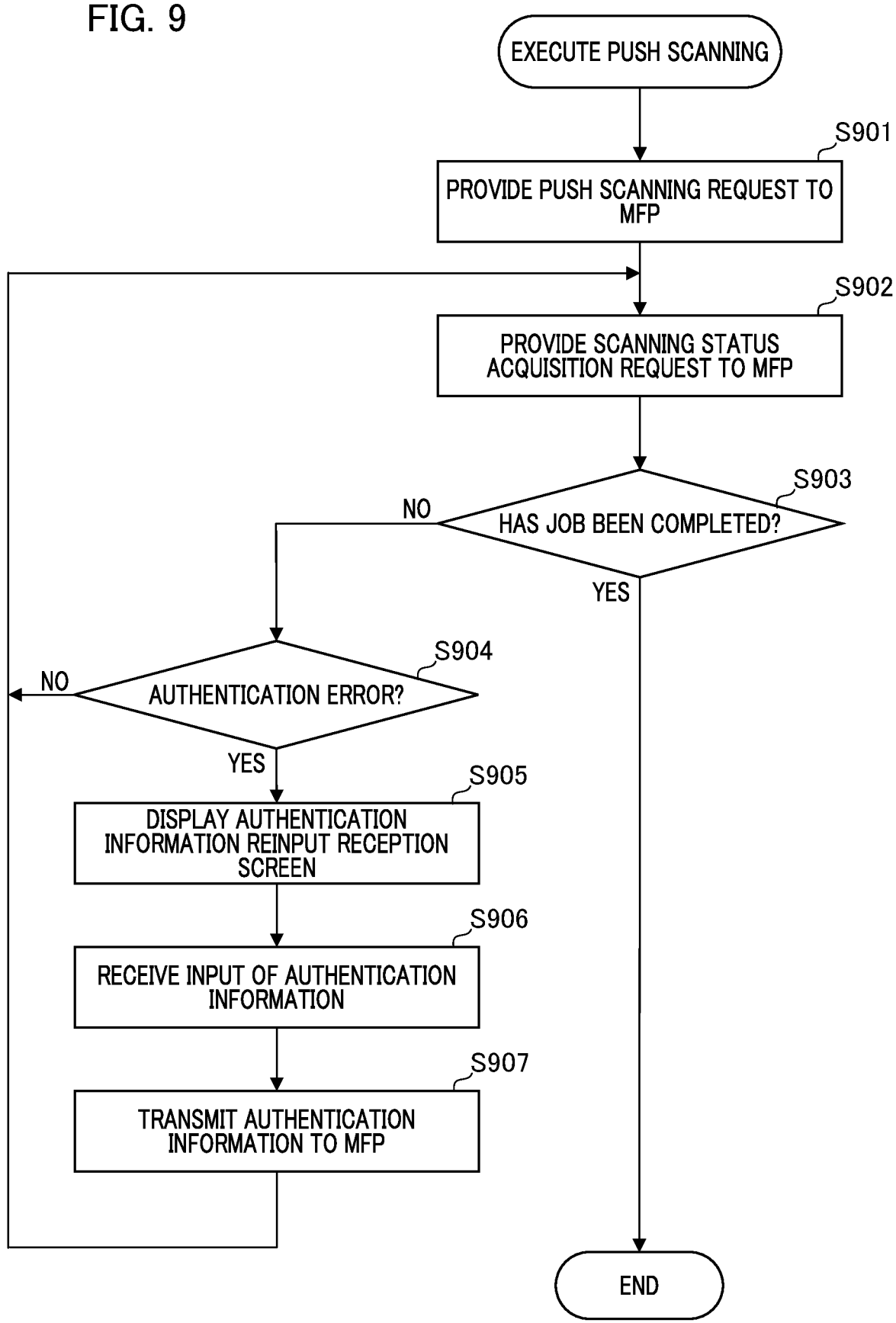
FIG. 9 is a diagram illustrating details of a flow of push scanning performed by the client terminal according to the first embodiment.

FIG. 9 is a diagram illustrating details of a flow of push scanning of the client terminal 102 according to the first embodiment. Specifically, details of the flow when the push scanning in S808 is executed in FIG. 8 are illustrated. In the description of the flow of the push scanning of the client terminal 102 will be provided on the basis of FIG. 9 and will also be provided using other diagrams as needed.

The client terminal 102 requests push scanning from the MFP 101 (S901). FIGS. 10A and 10B are diagrams illustrating communication content of the push scanning according to the first embodiment. FIG. 10A is an example of push scanning request content. The request is performed by using a POST method for an URI "http://192.168.1.00/ScanJob". The setting is described in and after ScanJob element of the XML format of a message body part. The Source element represents a reading target, and "Platen" indicates that the reading target is a platen. The Direction element represents a feed direction, and "ShortEdgeFeed" indicates that the feed direction is short edge feed. The Size element represents a size of a sheet to be read, and "A4" indicates that the size of the sheet to be read is A4. The Format element represents file transmission, and "jpeg" indicates that the file format is a JPEG format. The ColorMode element represents a color mode, and "Color" indicates that the color mode is color. The Resolution element represents resolution at the time of scanning. Elements in and after the Destination element represent destination information. The Uri element represents URI of the destination. The UserName element represents a user name in the authentication information. The Password element represents a password in the authentication information. If the authentication scheme is OAuth authentication, an element indicating information of an access token may be additionally used. FIG. 10B is a response example of a successful response to a request for POST of HTTP.

The client terminal 102 provides a scanning status acquisition request to the MFP 101 (S902). The request is performed using a GET method for URI "http://192.168.1.100/ScanStatus".

FIGS. 11A, 11B, and 11C are diagrams illustrating communication content of scanning status acquisition according to the first embodiment. The MFP 101 provides a response as illustrated in FIGS. 11A to 11C in response to the scanning status acquisition request. Details of the scanning status is described in and after the ScanStatus element in the XML format of the message body part. The State element represents a status of the scanning job, "Scanning" indicates that the status is scanning, and "Idle" indicates that the status is waiting. The ScanPage element represents the number of pages when the scanning has completed. The JobStatus element represents a status of the scanning job, "Processing" indicates that the status is processing, "WaitingAuth" indicates receiving reauthentication information, and "Completed" indicates completion. The JobResult element represents a result of the scanning job, "Success" indicates a normal end, and "Failure" indicates an abnormal end.

The client terminal 102 determines whether the scanning job requested in S901 has been completed (S903).

If the JobStatus element of XML acquired in S902 is "Completed", the client terminal 102 determines that the scanning job has been completed. If the scanning job is determined to have been completed, the client terminal 102 ends the push scanning processing.

If the scanning job has not been completed, the client terminal 102 determines whether an authentication error has occurred (S904). If an authentication error has not occurred, the processing proceeds to S902.

In a case of an authentication error, the client terminal 102 displays an authentication information reinput screen as illustrated in FIG. 5 (S905). The client terminal 102 receives an input of authentication information (S906). The client terminal 102 transmits the authentication information to the MFP 101 (S907). In this case, the client terminal 102 transmits the authentication information to URI "http://192.168.1.100/ScanJob". More specifically, the client terminal 102 transmits the authentication information by designating only the Destination element in the XML format of the message body part in the POST method. Note that the authentication information may be transmitted using authentication information dedicated URI. Thereafter, the processing proceeds to S902.

Figure 12:
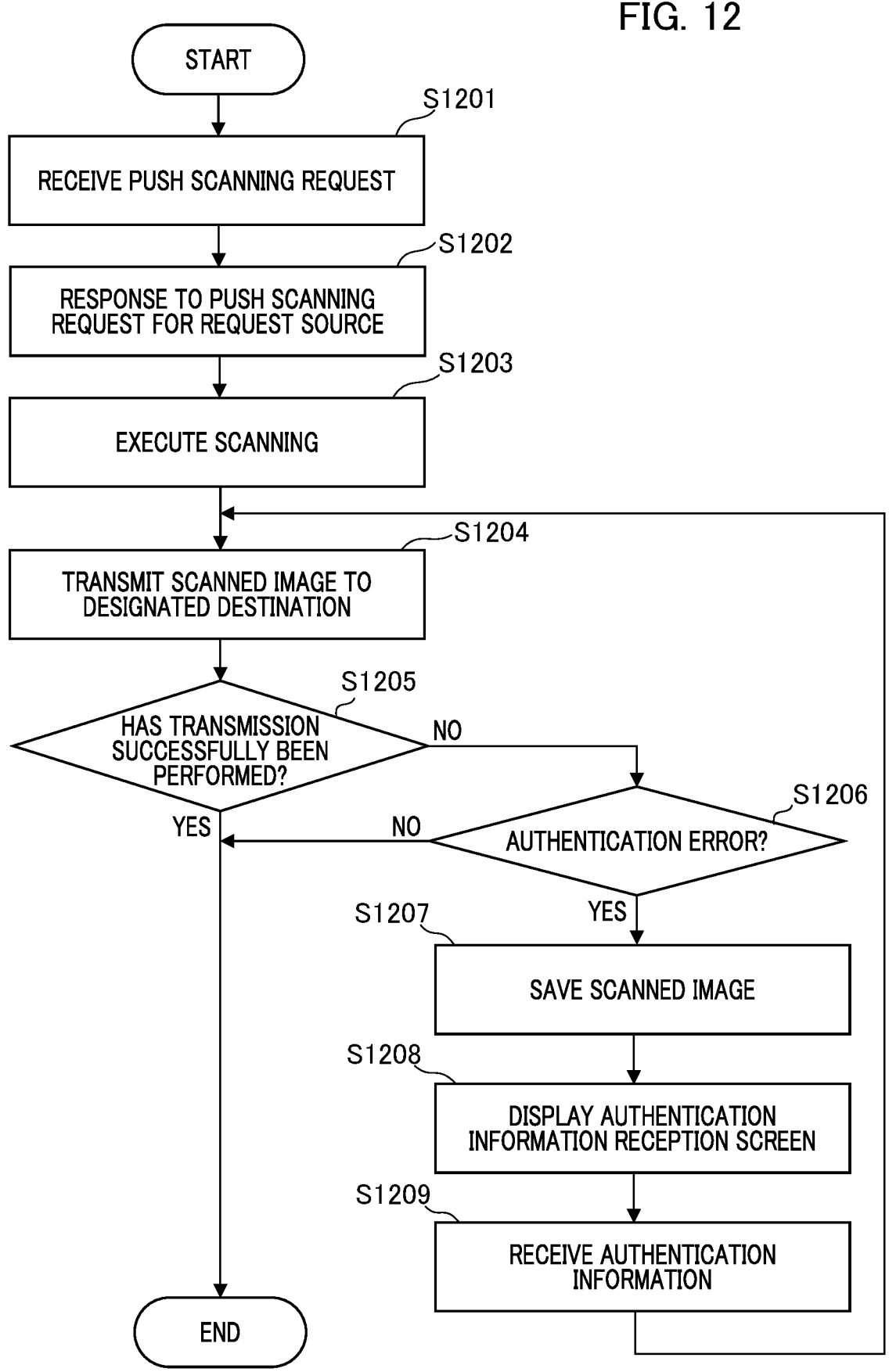
FIG. 12 is a diagram illustrating a flow of the push scanning of the MFP according to the first embodiment.

FIG. 12 is a diagram illustrating a flow of push scanning of the MFP 101 according to the first embodiment. The flow of the push scanning of the MFP 101 according to the present embodiment will be described with reference to FIG. 12. The description of the flow of the push scanning of the MFP 101 will be provided on the basis of FIG. 12 and will also be provided using other diagrams as needed.

The MFP 101 receives a push scanning request (S1201). The MFP 101 provides a response as illustrated in FIG. 10B to the request source (S1202). The MFP 101 executes scanning in setting of reading included in the scanning request (S1203). The MFP 101 transmits the scanned image to the designated destination included in the scanning request (S1204). The MFP 101 determines whether or not the transmission has successfully been performed (S1205). If the transmission has successfully been performed, the MFP 101 ends the processing. If the transmission has failed, whether an authentication error has occurred is determined (S1206). If no authentication error has occurred, the MFP 101 ends the processing. In a case of an authentication error, the MFP 101 saves the scanned image therein (S1207). The MFP 101 displays an authentication information reception screen as illustrated in FIG. 4 (S1208). The MFP 101 receives authentication information (S1209). If the authentication information has not been received for a specific period of time, or if a cancel notification has been received from specific URI prepared in advance by the client terminal 102, predetermined processing may be performed. Examples of the predetermined processing include stopping of reception of the authentication information, deletion of the saved image, ending of the push scanning processing, and the like. Thereafter, the processing proceeds to S1204.

Figure 13:
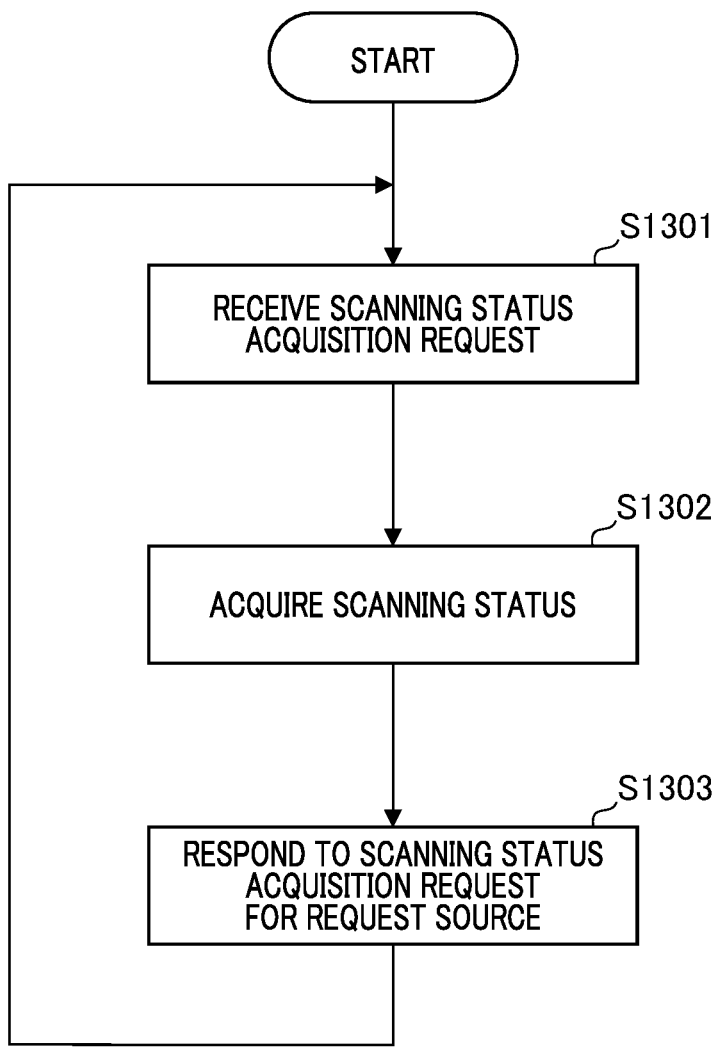
FIG. 13 is a diagram illustrating a flow at the time of reception of a scanning status acquisition request of the MFP according to the first embodiment.

FIG. 13 is a diagram illustrating a flow of the MFP 101 at the time of receiving a scanning status acquisition request according to the first embodiment. The flow of a scanning status acquisition request of the MFP 101 according to the present embodiment will be described with reference to FIG. 13. The description of the flow of the scanning status acquisition request of the MFP 101 will be provided on the basis of FIG. 13 and will also be provided using other diagrams as needed.

The MFP 101 receives a scanning status acquisition request (S1301). The MFP 101 acquires a scanning status (S1302). The MFP 101 provides a response as illustrated in FIGS. 11A to 11C to the request source in accordance with the scanning status (S1303). If the scanning job is being processed, a response as in FIG. 11A is provided. If the scanning job is receiving of the authentication information again due to an authentication error, a response as in FIG. 11B is provided. If the scanning job is completed, a response as in FIG. 11C is provided.

According to the first embodiment, it is possible to eliminate an effort of the user performing placement of the original document and a scanning operation again if an authentication error has occurred when the information processing apparatus provides an instruction for push scanning with authentication information included therein to the image reading apparatus. Note that although the authentication information is received again at the time of an authentication error in the image reading apparatus in the present embodiment, the present invention is not limited thereto. For example, a setting value may be provided for switching between whether to receive authentication again or to choose ending with an authentication error when an authentication error has occurred in the image reading apparatus.

Second Embodiment

As a second embodiment of the present invention, a method in which whether or not authentication will successfully be performed with authentication information is checked in advance when the client terminal 102 provides a request for push scanning with the authentication information included therein to the MFP 101 will be described. In the present embodiment, it is assumed that HTTP is used for communication, and an IP address of the MFP 101 is "192.168.1.100".

Since the system configuration, the hardware configuration of the MFP 101, and the setting screen of the scanning application of the client terminal 102 are the same as those in the first embodiment, description thereof will be omitted with reference to FIGS. 1, 2, and 3. Since the screen when authentication information is examined in advance by the scanning application of the client terminal 102, and an authentication error has occurred is the same as that in the first embodiment, description thereof will be omitted with reference to FIG. 5. The transmission completion screen of the scanning application of the client terminal 102 is the same as that in the first embodiment, description thereof will be omitted with reference to FIG. 6.

Figure 14:
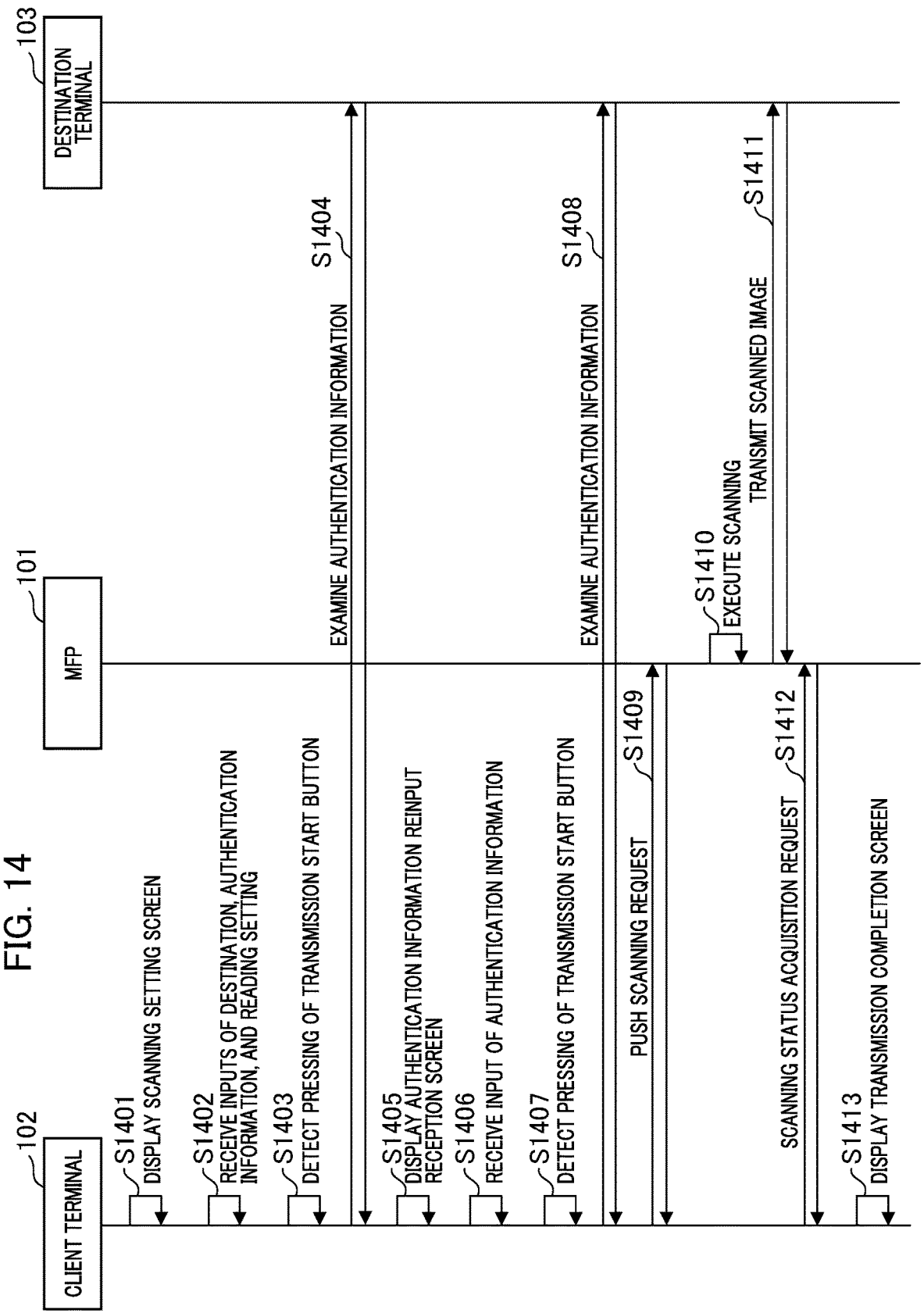
FIG. 14 is a diagram illustrating sequences of an MFP, a client terminal, and a destination terminal according to a second embodiment.

FIG. 14 is a diagram illustrating sequences of the MFP 101, the client terminal 102, and the destination terminal 103 according to the second embodiment. Sequences of the processing implemented on the MFP 101, the client terminal 102, and the destination terminal 103 in the present embodiment will be described with reference to FIG. 14.

The client terminal 102 displays a scanning setting screen as illustrated in FIG. 3 (S1401). The client terminal 102 receives destination setting and reading setting operations and performs the setting (S1402). The client terminal 102 detects that the "transmission start" button 310 has been pressed (S1403).

The client terminal 102 examines whether or not authentication will successfully be performed with the authentication information input in S1402 for the destination terminal 103 (S1404). In this case, the client terminal 102 switches the processing depending on whether or not an authentication error has occurred. In this sequence, a case in which an authentication error has occurred will be described. The client terminal 102 displays an authentication information reinput screen as illustrated in FIG. 5 (S1405). The client terminal 102 receives an input of authentication information (S1406). The client terminal 102 detects that the "transmission start" button 503 has been pressed (S1407). The client terminal 102 examines whether or not authentication will successfully be performed with the authentication information input in S1406 for the destination terminal 103 (S1408). In this case, the client terminal 102 switches processing depending on whether or not an authentication error has occurred. In this sequence, a case in which no authentication error has occurred will be described. The client terminal 102 requests execution of push scanning from the MFP 101, and the MFP 101 responds to the request (S1409). The MFP 101 executes scanning (S1410) and transmits the scanned image to the designated destination (S1411). The client terminal 102 requests acquisition of a scanning status from the MFP 101, and the MFP 101 responds to the request (S1412). The client terminal 102 displays a transmission completion screen as illustrated in FIG. 6 (S1413).

Figure 15:
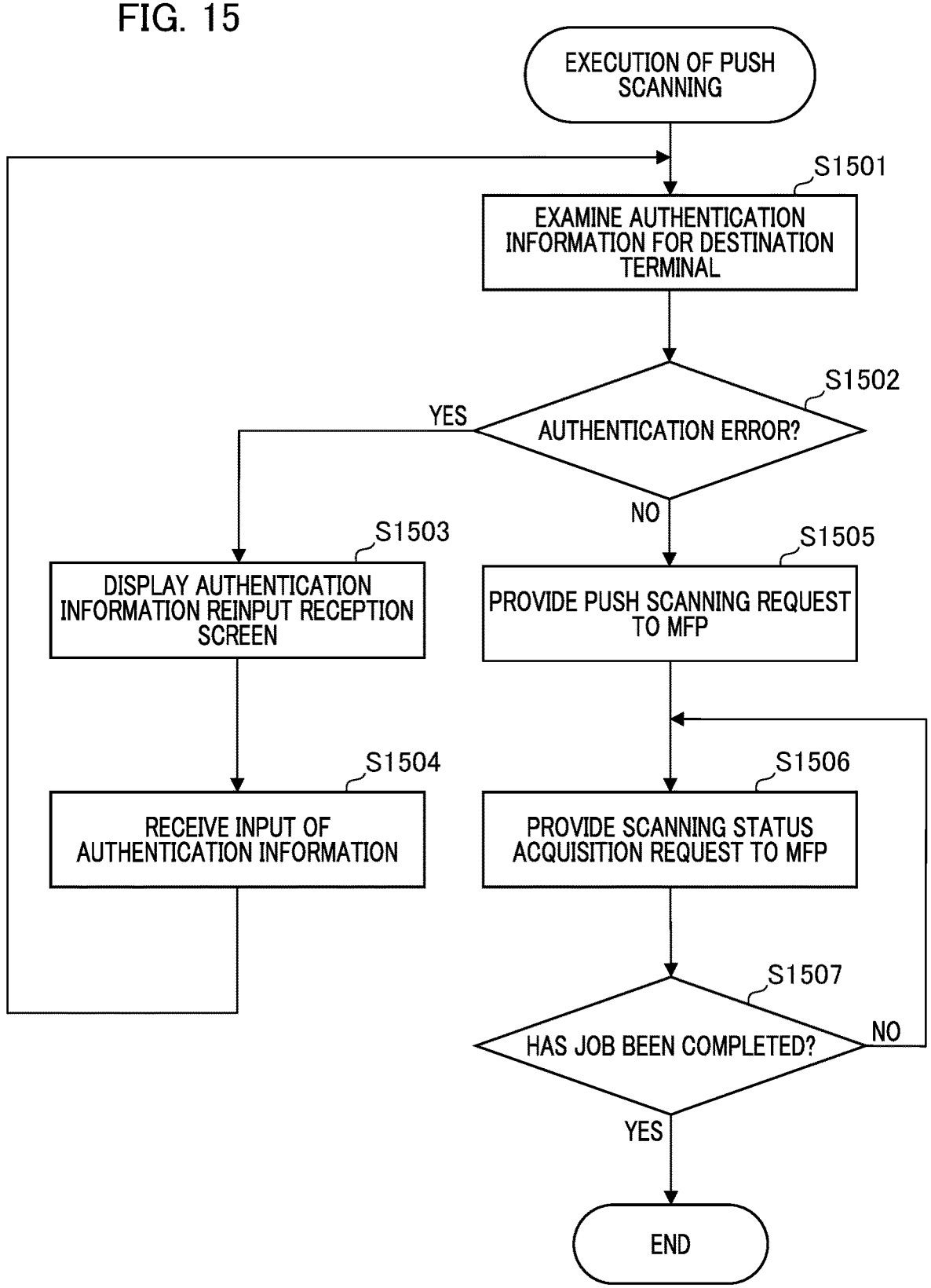
FIG. 15 is a diagram illustrating details of a flow of push scanning of the client terminal according to the second embodiment.

Although the flow of the client terminal 102 is similar to the flow illustrated in FIG. 8 in the first embodiment, the push scanning operation in 5808 is different. Therefore, operations of the push scanning in the present embodiment will be specifically described. FIG. 15 is a diagram illustrating details of a flow of the push scanning of the client terminal 102 according to the second embodiment. Details of the flow when the push scanning is executed will be described with reference to FIG. 15.

The client terminal 102 examines the authentication information (S1501). Examples of the examination method include acquisition of a list of files for a destination folder path for basic authentication, checking of expiration data of an access token for OAuth authentication, and the like. If the authentication scheme is OAuth authentication, and the expiration date of the access token has been expired, processing of checking the update period with a refresh token may be performed, and the authentication may be determined to have successfully been made if the updating has successfully ben performed, or an authentication error may be determined to have occurred if the updating has failed.

The client terminal 102 determines whether or not occurrence of an authentication error has been determined as a result of the examination in S1501 (S1502).

In a case of an authentication error, the client terminal 102 displays an authentication information reinput screen as illustrated in FIG. 5 (S1503). The client terminal 102 receives an input of authentication information (S1504). Thereafter, the processing returns to S1501.

If no authentication error has been determined, the client terminal 102 requests push scanning from the MFP 101 (S1505). Since an example of the push scanning request content is the same as that in the first embodiment, description thereof will be omitted with reference to FIG. 10A. The client terminal 102 provides a scanning status acquisition request to the MFP 101 (S1506). The request is performed by using a GET method for URI "http://192.168.1.100/ScanStatus". Since a response to the request is the same as that in the first embodiment, description thereof will be omitted with reference to FIGS. 11A and 11C. The client terminal 102 determines whether the scanning job requested in S1505 has been completed (S1507).

If it is determined that the scanning job has not been completed, the processing proceeds to S1506. On the other hand, if it is determined that the scanning job has been completed, the client terminal 102 ends the push scanning processing.

Figure 16:
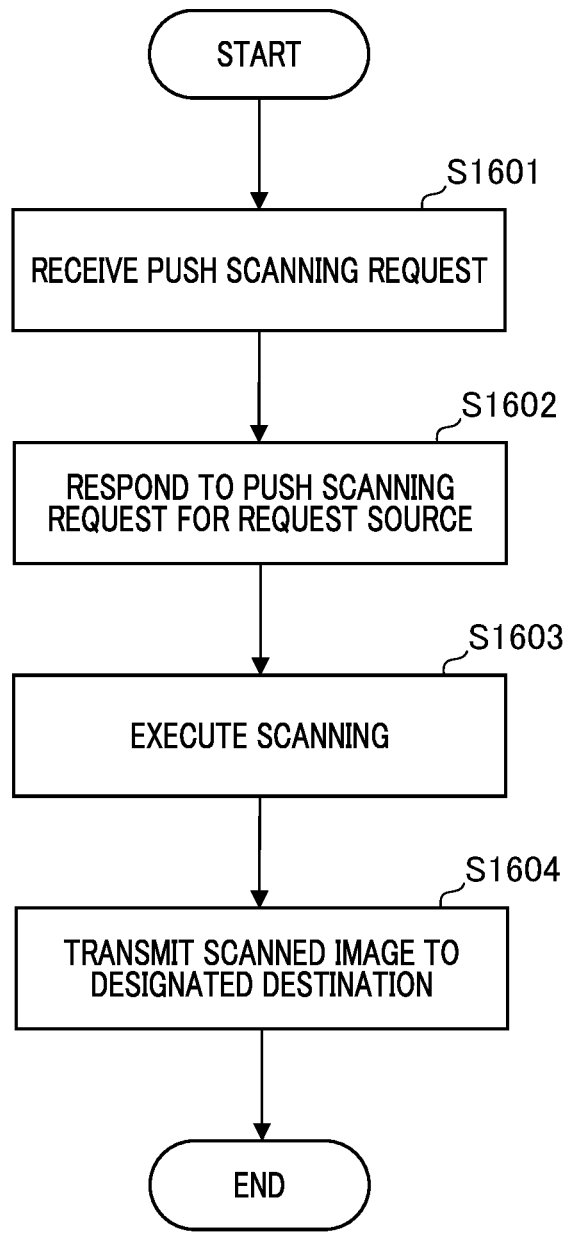
FIG. 16 is a diagram illustrating a flow of push scanning of the MFP according to the second embodiment.

FIG. 16 is a diagram illustrating a flow of push scanning of the MFP 101 according to the second embodiment. The flow of the push scanning of the MFP 101 according to the present embodiment will be described with reference to FIG. 16.

The MFP 101 receives a push scanning request (S1601). The MFP 101 responds to the push scanning request for the request source (S1602). Since the response content is the same as that in the first embodiment, description thereof will be omitted with reference to FIG. 10B. The MFP 101 executes scanning with the reading setting included in the scanning request (S1603). The MFP 101 transmits the scanned image to the designated destination included in the scanning request (S1604). Thereafter, the MFP 101 ends the processing.

Since the flow of the scanning status acquisition request of the MFP 101 is the same as that in the first embodiment, description thereof will be omitted with reference to FIG. 13.

According to the second embodiment, it is possible to eliminate efforts of the user performing placement of the original document and scanning setting again if an authentication error has occurred when the information processing apparatus provides an instruction for push scanning with the authentication information included therein to the image reading apparatus. Note that although the reauthentication is performed in the prior examination of the authentication information in the information processing apparatus in the present embodiment, the present invention is not limited thereto. For example, a setting value for switching between whether to perform reauthentication or to choose ending with an authentication error when an authentication error has occurred in the prior examination of the authentication information in the client terminal may be set.

Third Embodiment

As a third embodiment of the present invention, a method of using authentication information liked to a destination and a log-in user of the image reading apparatus when the image reading apparatus receives an instruction for push scanning will be described. Since the system configuration and the hardware configuration of the MFP 101 are the same as those in the first embodiment, description thereof will be omitted with reference to FIGS. 1 and 2.

Figure 17:
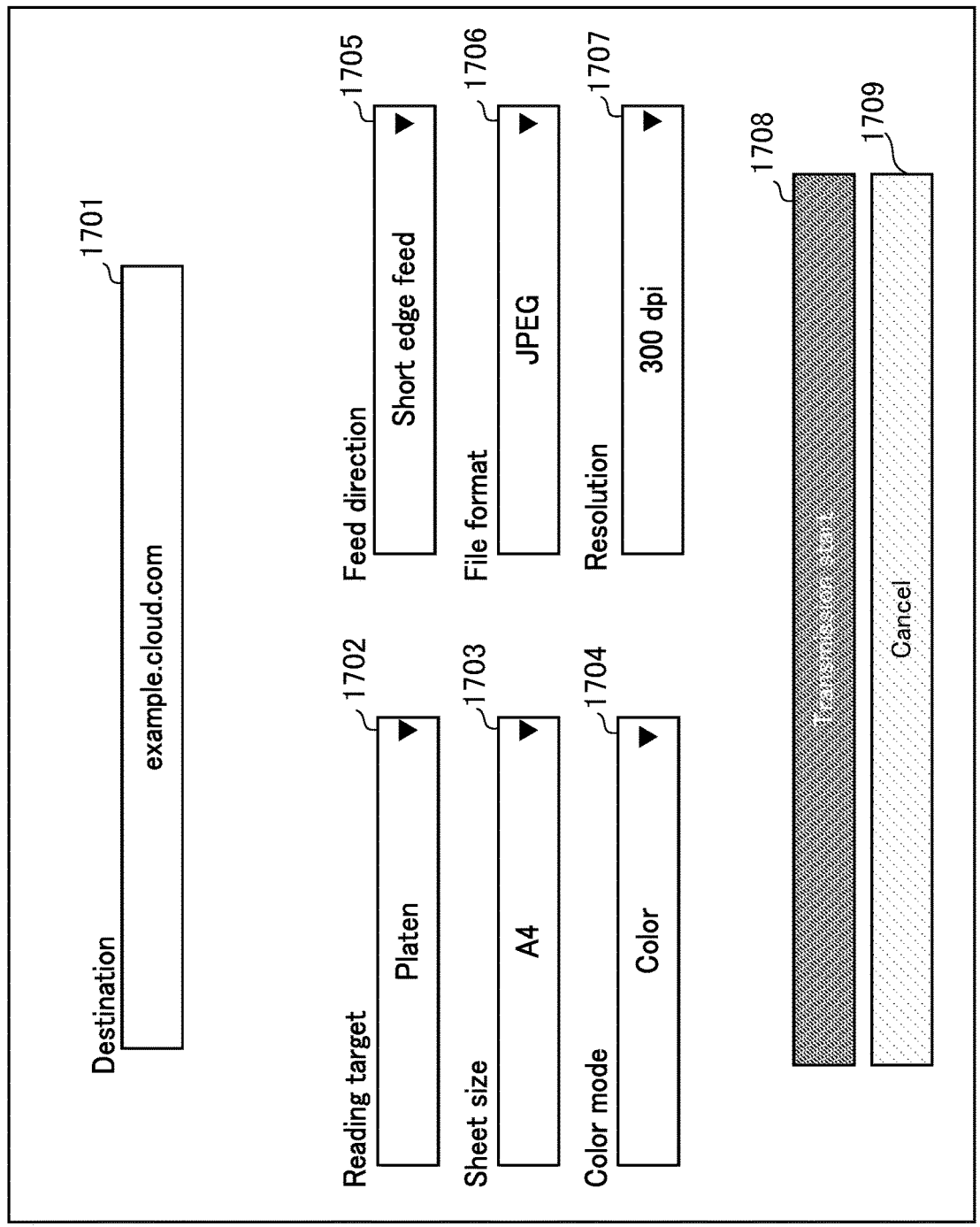
FIG. 17 is a diagram illustrating a scanning setting screen of a scanning application of a client terminal according to a third embodiment.

FIG. 17 is a diagram illustrating a scanning setting screen of a scanning application of the client terminal 102 according to the third embodiment. An example of the scanning setting screen of the scanning application in the client terminal 102 will be described with reference to FIG. 17.

A "destination setting" button 1701 is a button for setting a destination. The user can select a desired destination from destinations registered in the client terminal 102 by pressing the "destination setting" button 1701. In a case in which the destination is not included in the list of the destinations, the user can also newly input the destination. A destination folder path may be able to be designated. A configuration in which a plurality of destinations can be set and authentication information can be set for each destination may also be adopted.

Buttons 1702 to 1707 are buttons for reading setting, and a current setting value is displayed on each button. The "reading target setting" button 1702 is a button for setting a reading target (a platen or a feeder). The "sheet size setting" button 1703 is a button for setting a size of the sheet to be read (an A4 size, an A3 size, or the like). The "color mode setting" button 1704 is a button for setting a color mode (color, monochrome, or the like) at the time of scanning. The "feed direction setting" button 1705 is a button for setting a feed direction (longitudinal feed or transverse feed) of the original document. The "file format setting" button 1706 is a button for setting a file format (JPEG, PDF, or the like) of the image to be transmitted. The "resolution setting" button 1707 is a button for setting resolution (300 dpi, 600 dpi, or the like) at the time of scanning.

The "transmission start" button 1708 is a button for starting transmission processing. The "cancel" button 1709 is a button for closing this application.

Since the transmission completion screen of the scanning application of the client terminal 102 is the same as that in the first embodiment, description thereof will be omitted with reference to FIG. 6.

Figure 18:
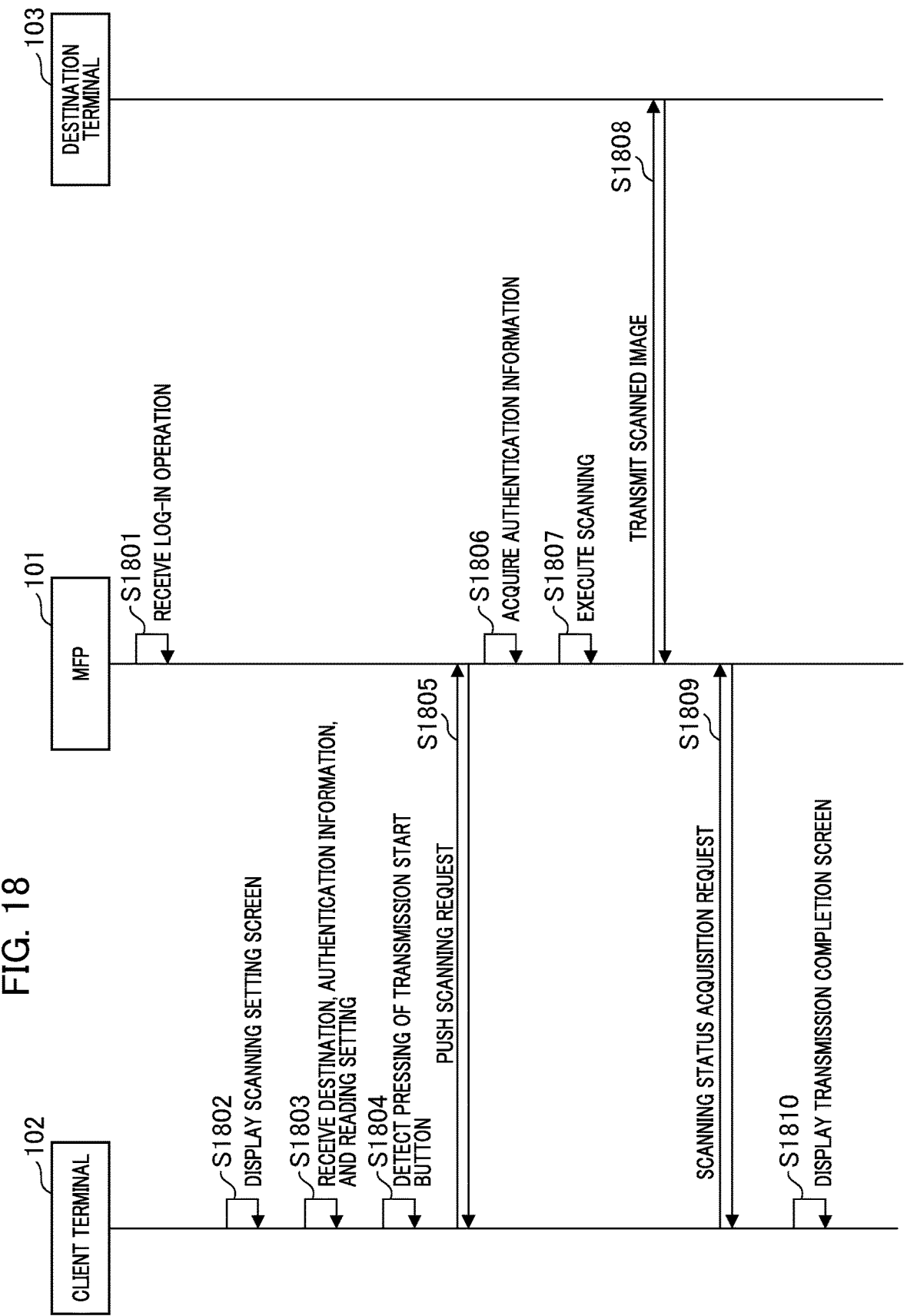
FIG. 18 is a diagram illustrating sequences of an MFP, a client terminal, and a destination terminal according to the third embodiment.

FIG. 18 is a diagram illustrating sequences of the MFP 101, the client terminal 102, and the destination terminal 103 according to the third embodiment. Sequences of the processing implemented in the MFP 101, the client terminal 102, and the destination terminal 103 according to the present embodiment will be described with reference to FIG. 18.

The MFP 101 receives a log-in operation (S1801). The client terminal 102 displays a scanning setting screen as illustrated in FIG. 17 (S1802). The client terminal 102 receives destination setting and reading setting operations and performs the setting (S1803). The client terminal 102 detects that the "transmission start" button 1708 has been pressed (S1804).

The client terminal 102 requests execution of push scanning from the MFP 101, and the MFP 101 responds to the request (S1805). The MFP 101 acquires destination information included in the push canning request and authentication information linked to the user who has logged in in S1801 (S1806). Here, the ROM 202 of the MFP 101 is an example of a holding unit configured to hold the authentication information for accessing the destination and the log-in user in a linked manner.

Table 1 is an example of a table for managing the destination information and the authentication information linked to the user who has logged in. A log-in user, a destination, and a user name and a password as authentication information have been registered in 1 record if basic authentication is used as the authentication scheme. An access token and a refresh token may be able to be registered as the authentication information if OAuth authentication is used as the authentication scheme.

TABLE 1

| ID | Login User | Host name | User name | Password |
|---|---|---|---|---|
| 1 | A | example.cloud.com | userA | 1234 |
| 2 | B | example.cloud.com | userB | 5678 |
| ... | ... | ... | ... | ... |

The MFP 101 executes scanning (S1807) and transmits the scanned image to the destinated destination using the authentication information acquired in S1806 (S1808). The client terminal 102 requests acquisition of a scanning status from the MFP 101, and the MFP 101 responds to the request (S1809). The client terminal 102 displays a transmission completion screen as illustrated in FIG. 6 (S1810).

Figure 19:
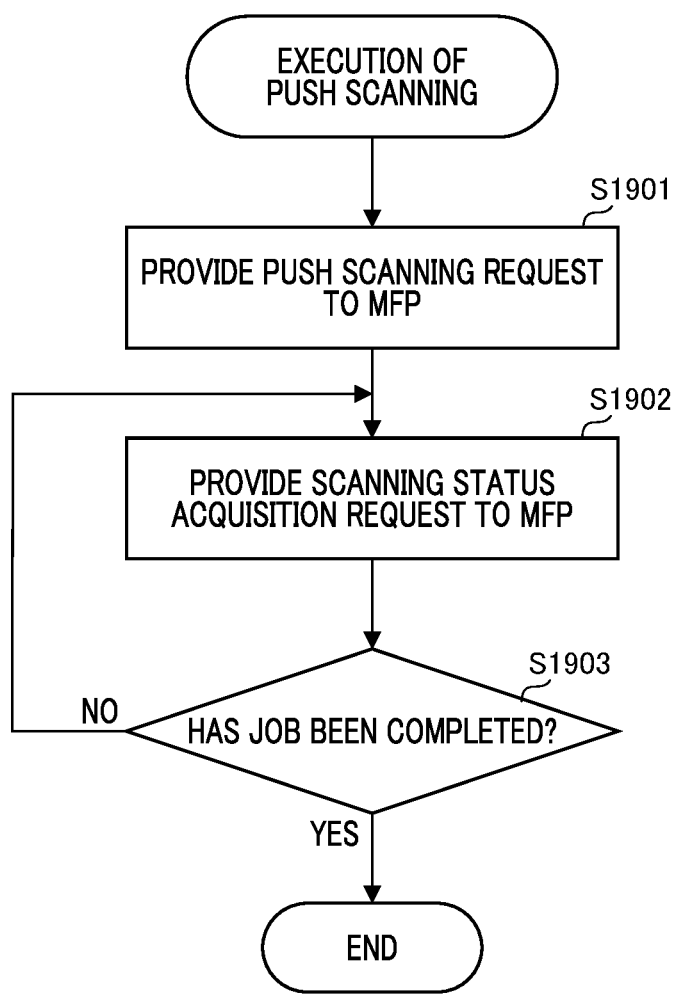
FIG. 19 is a diagram illustrating details of a flow of push scanning of the client terminal according to the third embodiment.

Although the flow of the client terminal 102 is the same as that in FIG. 8 in the first embodiment, the push scanning operation in S808 is different. FIG. 19 is a diagram illustrating details of the flow of the push scanning of the client terminal 102 according to the third embodiment. Details of the flow when the push scanning is executed will be described with reference to FIG. 19.

The client terminal 102 requests push scanning from the MFP 101 (S1901). Since an example of the push scanning request content is the same as that in the first embodiment except for the UserName element and the Password element, description thereof will be omitted with reference to FIG. 10A. The client terminal 102 provides a scanning status acquisition request to the MFP 101 (S1902). The request is performed by using the GET method for URI "http://192.168.1.100/ScanStatus". Since a response to the request is the same as those in FIGS. 11A and 11C in the first embodiment, description thereof will be omitted with reference to the drawings. The client terminal 102 determines whether the scanning job requested in S1901 has been completed (S1903).

In a case in which it is determined that the scanning job has not been completed, the processing proceeds to S1902. In a case in which it is determined that the scanning job has been completed, the client terminal 102 ends the push scanning processing.

Since the flow of the push scanning of the MFP 101 is the same as that in the second embodiment, description thereof will be omitted with reference to FIG. 12. Since the flow of the scanning status acquisition request of the MFP 101 is the same as that in the first embodiment, description thereof will be omitted with reference to FIG. 13.

According to the third embodiment, the user can request push scanning without performing an operation of inputting authentication information. Note that although the destination and the authentication information linked to the user who has logged in the image reading apparatus are used when the image reading apparatus receives an instruction for push scanning in the present embodiment, the present invention is not limited thereto. For example, a setting value for switching between whether or not to use the destination and the authentication information linked to the user who has logged in the image reading apparatus when the image reading apparatus receives an instruction for push scanning may be provided.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-135580, filed Aug. 23 2021, which is hereby incorporated by reference wherein in its entirety.

What is claimed is:

1. An image reading apparatus comprising:
a memory storing instructions; and
a processor executing the instructions causing the image reading apparatus to:
receive, from an information processing apparatus, a scanning request for push scanning for a designated destination;
scan an original document and generate image data in accordance with the scanning request;
transmit, to the destination, a request including authentication for accessing the destination and the image data;
save the image data for transmission based on reauthentication if a response indicating that there has been an error in authentication using the authentication information is received; and
provide a notification of the error to the information processing apparatus,
wherein the instruction causes the image reading apparatus to transmit, to the destination, a request including authentication information for the reauthentication and the saved image data if the authentication information for the reauthentication in response to the notification of the error is received from the information processing apparatus.

2. The image reading apparatus according to claim 1, wherein the instruction causes the image reading apparatus to receive, from the information processing apparatus, the authentication information for the reauthentication in response to the notification of the error and the destination together, and
wherein the image reading apparatus is a composite machine that also has a printing function.

3. The image reading apparatus according to 1, wherein the instruction causes the image reading apparatus to save the image data if an error occurs in the authentication using the authentication information.

4. A method for controlling an image reading apparatus comprising:
receiving, from an information processing apparatus, a scanning request for push scanning for a designated destination;
scanning an original document and generating image data in response to the scanning request;
transmitting, to the destination, a request including authentication information for accessing the destination and the image data;
saving the image data for transmission based on reauthentication if a response indicating that an error has occurred in authentication using the authentication information is received; and
providing a notification of the error to the information processing apparatus,
wherein if authentication information for reauthentication in response to the notification of the error is received from the information processing apparatus, a request including authentication information for the reauthentication and the saved image data is transmitted to the destination.

5. A non-transitory storage medium on which is stored a computer program related to a method for controlling an image reading apparatus, the method comprising:
receiving, from an information processing apparatus, a scanning request for push scanning for a designated destination;
scanning an original document and generating image data in response to the scanning request;
transmitting, to the destination, a request including authentication information for accessing the destination and the image data, and
saving the image data for transmission based on reauthentication if a response indicating that an error has occurred in authentication using the authentication information is received; and
providing a notification of the error to the information processing apparatus,
wherein if authentication information for reauthentication in response to the notification of the error is received from the information processing apparatus, a request including the authentication information for the reauthentication and the saved image is transmitted to the destination.

* * * * *